US011199972B2

(12) United States Patent
Jin et al.

(10) Patent No.: US 11,199,972 B2
(45) Date of Patent: Dec. 14, 2021

(54) INFORMATION PROCESSING SYSTEM AND VOLUME ALLOCATION METHOD

(71) Applicant: HITACHI, LTD., Tokyo (JP)

(72) Inventors: Azusa Jin, Tokyo (JP); Hideo Saito, Tokyo (JP); Masakuni Agetsuma, Tokyo (JP); Soichi Takashige, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 16/299,242

(22) Filed: Mar. 12, 2019

(65) Prior Publication Data

US 2019/0332275 A1   Oct. 31, 2019

(30) Foreign Application Priority Data

Apr. 25, 2018 (JP) .............................. JP2018-084296

(51) Int. Cl.
G06F 3/06 (2006.01)
G06F 11/14 (2006.01)
G06F 11/20 (2006.01)
G06F 16/182 (2019.01)
G06F 16/188 (2019.01)

(52) U.S. Cl.
CPC ............ G06F 3/0611 (2013.01); G06F 3/068 (2013.01); G06F 3/0631 (2013.01); G06F 3/0664 (2013.01); G06F 3/0685 (2013.01); G06F 11/1484 (2013.01); G06F 11/2028 (2013.01); G06F 16/188 (2019.01); G06F 16/1844 (2019.01); G06F 3/067 (2013.01); G06F 3/0647 (2013.01); G06F 11/2092 (2013.01)

(58) Field of Classification Search
CPC ............ G06F 11/1484; G06F 11/2028; G06F 16/1844; G06F 3/0611; G06F 3/0631; G06F 3/0664; G06F 3/068; G06F 3/0685; G06F 11/1482; G06F 11/2092; G06F 11/2094; G06F 11/2097; G06F 16/188; G06F 3/0647; G06F 3/067
See application file for complete search history.

(56) References Cited

U.S. PATENT DOCUMENTS

| 9,336,266 B2* | 5/2016 | Reddy ................. G06F 9/45558 |
| 2015/0324145 A1* | 11/2015 | Akutsu ................ G06F 3/0619 |
| | | 711/114 |
| 2019/0005106 A1* | 1/2019 | Kalach ................ G06F 11/1451 |
| 2019/0188100 A1* | 6/2019 | Patel ....................... G06F 3/065 |
| 2019/0222646 A1* | 7/2019 | Rao ..................... H04L 67/1097 |

* cited by examiner

Primary Examiner — Bryce P Bonzo
Assistant Examiner — Michael Xu
(74) Attorney, Agent, or Firm — Mattingly & Malur, PC

(57) ABSTRACT

The present invention proposes an information processing system and a volume allocation method making it feasible to reduce overall system operation cost. A replication group to carry out replication is comprised of one or multiple nodes. A storage node classifies respective storage devices mounted thereon into plural storage hierarchies according to the drive type of each of the storage devices for management of the storage devices. A controller node allocates, to each node of the nodes constituting the replication group, a volume for which a storage device of a storage hierarchy suitable for a type of middleware that the node uses and a node type of the node acting in the replication group provides a storage area.

8 Claims, 15 Drawing Sheets

DRIVE JUDGMENT TABLE 64

| MIDDLEWARE TYPE | NODE CLASS | NUMBER OF NODES | NODE TYPE | DRIVE TYPE |
|---|---|---|---|---|
| MIDDLEWARE 1 | 1ST CLASS | 1 | Primary | SSD |
| | 2ND CLASS | REMAINS | Secondary | HDD |
| MIDDLEWARE 2 | 1ST CLASS | 1 | Master | HDD |
| | 2ND CLASS | REMAINS | Slave | SDD |
| MIDDLEWARE 3 | 1ST CLASS | 1 | Primary | SSD |
| | 2ND CLASS | 1 | Secondary1 | SSD |
| | 3RD CLASS | REMAINS | Secondary2 | HDD |
| ... | ... | ... | ... | ... |

DRIVE JUDGMENT TABLE 64

| MIDDLEWARE TYPE | NODE CLASS | NUMBER OF NODES | NODE TYPE | DRIVE TYPE |
|---|---|---|---|---|
| MIDDLEWARE 1 | 1ST CLASS | 1 | Primary | SSD |
|  | 2ND CLASS | REMAINS | Secondary | HDD |
| MIDDLEWARE 2 | 1ST CLASS | 1 | Master | HDD |
|  | 2ND CLASS | REMAINS | Slave | SDD |
| MIDDLEWARE 3 | 1ST CLASS | 1 | Primary | SSD |
|  | 2ND CLASS | 1 | Secondary1 | SSD |
|  | 3RD CLASS | REMAINS | Secondary2 | HDD |
| ... | ... | ... | ... | ... |

STORAGE SPACE MANAGEMENT TABLE 65

| STORAGE NODE ID | DRIVE TYPE | FREE SPACE |
|---|---|---|
| 1 | SSD | 1500GB |
| 1 | HDD | 10000GB |
| 2 | SSD | 1000GB |
| 2 | HDD | 30000GB |
| 3 | SSD | 2000GB |
| 3 | HDD | 20000GB |
| ... | ... | ... |

COMPUTE SERVER MANAGEMENT TABLE 66

| COMPUTE SERVER ID | VIRTUAL MACHINE ID | PROCESS ID | MIDDLEWARE TYPE | NODE TYPE | STORAGE NODE ID | VOLUME ID | DRIVE TYPE |
|---|---|---|---|---|---|---|---|
| 1 | 1 | 1 | MIDDLEWARE 1 | Primary | 1 | 1 | SSD |
|   | 1 | 2 | MIDDLEWARE 1 | Primary | 4 | 41 | SSD |
|   | ... | ... | ... | ... | ... | ... | ... |
|   | 2 | 21 | MIDDLEWARE 2 | Master | 1 | 2 | HDD |
|   | ... | ... | ... | ... | ... | ... | ... |
| 2 | 1 | 1 | MIDDLEWARE 2 | Slave | 3 | 30 | SDD |
|   | ... | ... | ... | ... | ... | ... | ... |
|   | 2 | 4 | MIDDLEWARE 1 | Secondary | 2 | 20 | HDD |
|   | ... | ... | ... | ... | ... | ... | ... |
| 3 | 1 | 1 | MIDDLEWARE 2 | Slave | 2 | 22 | SDD |
|   | ... | ... | ... | ... | ... | ... | ... |
| ... | ... | ... | ... | ... | ... | ... | ... |
| 66A | 66B | 66C | 66D | 66E | 66F | 66G | 66H |

FIG. 8

REPLICATION MANAGEMENT TABLE 67

| REPLICATION ID | 2ND CLASS | | | 2ND CLASS | | |
| --- | --- | --- | --- | --- | --- | --- |
| | COMPUTE SERVER ID | VIRTUAL MACHINE ID | PROCESS ID | COMPUTE SERVER ID | VIRTUAL MACHINE ID | PROCESS ID |
| REPLICATION1 | 1 | 1 | 1 | 2 | 2 | 4 |
| | | | | 4 | 1 | 2 |
| REPLICATION2 | 1 | 2 | 21 | 2 | 1 | 1 |
| | | | | 3 | 1 | 1 |
| ... | ... | ... | ... | ... | ... | ... |

67A — REPLICATION ID
67B — 2ND CLASS
67BA — COMPUTE SERVER ID
67BB — VIRTUAL MACHINE ID
67BC — PROCESS ID

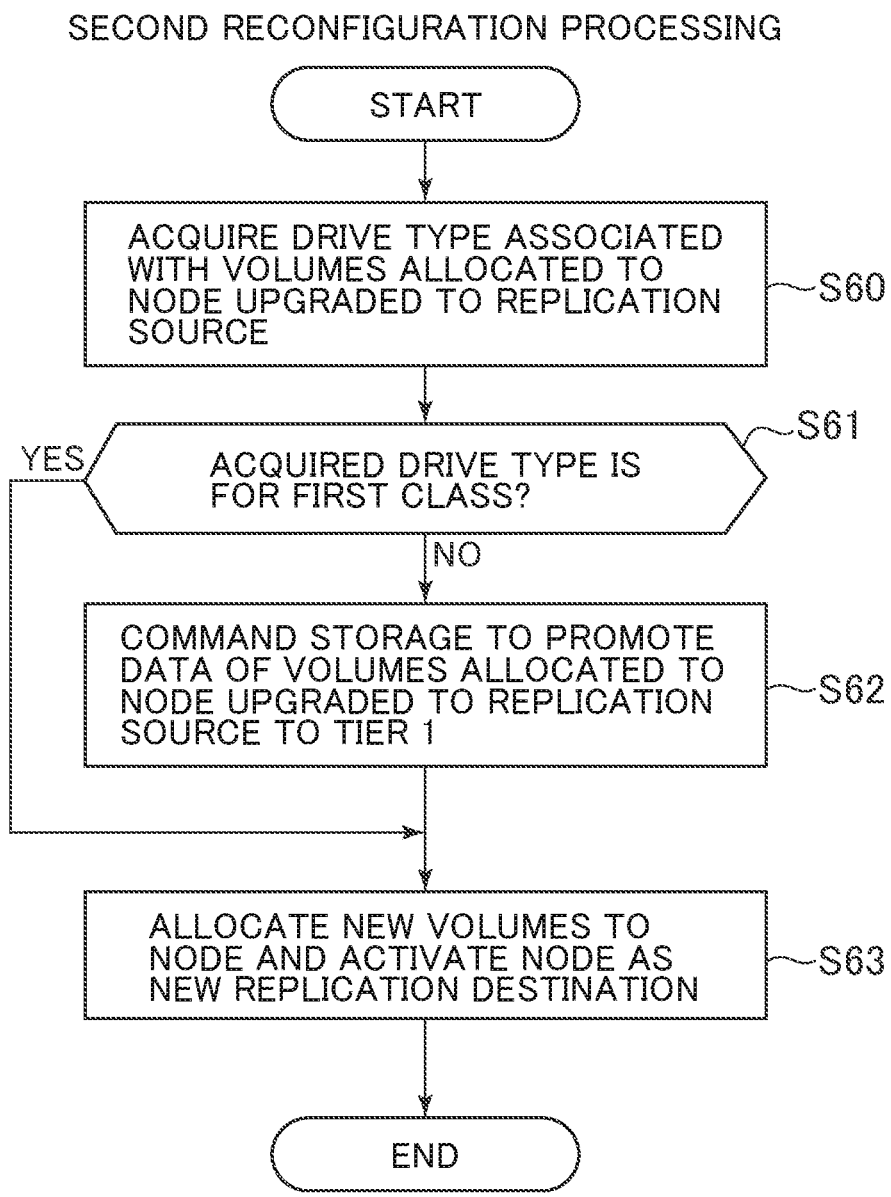

INFORMATION PROCESSING SYSTEM AND VOLUME ALLOCATION METHOD

BACKGROUND

The present invention relates to a storage system and a method for controlling thereof and the present invention is advantageously suited for application to, for example, an information processing system where plural types of virtual machines run which carry out replication and have respectively different levels of response performance for a volume that is requested.

Lately, middleware such as Hadoop and NoSQL (Not only SQL (Structured Query Language)) is widely used for big data analysis, Web-scale services, etc.

In order to reduce TCO (Total Cost of Ownership), especially, large-scale users have lately adopted distributed SDS (Software Defined Storage), whereas having used local drives conventionally, and scales storages and compute devices which are on a higher level than the storages independently of each other.

However, users of OSS (Open Source Software) middleware often do not know much about storage. Hence, functions which are complicated to utilize well, such as a hierarchical memory control function and compression and deduplication functions with which storage devices are equipped, are too difficult to use and do not gain popularity among OSS middleware users.

Therefore, an information processing system having adopted distributed SDS is required to make it easy to utilize SDS functions well by running in conjunction with OSS middleware. U.S. Pat. No. 9,336,266 discloses a method that lessens difficulty in establishing an environment using procedures which differ for each middleware by automatically deploying virtual machines (VMs) together with middleware running on each VM.

SUMMARY

Meanwhile, some type of middleware that is used by virtual machines or processes running on the virtual machines (a virtual machine and a process will be jointly referred to as a node, hereinafter) may cause a significant difference in the frequency of execution of I/O processing among the nodes. Hence, when allocating volumes to nodes, so far, there has been a need to allocate volumes whose attribute is suitable for a type of middleware that is used by each of the nodes that carry out replication and for the type of each node (this will be hereinafter referred to as a node type) in a replication configuration, for the sake of cost reduction.

Here, a "replication configuration" refers to a configuration of a replication environment including, inter alia, a total number of nodes that execute replication and the number of nodes which are set as a replication source or a replication destination respectively for the replication. Also, a "node type" refers to the role of the node in replication (replication source or destination). Moreover, a "volume's attribute" refers to response performance of the volume. Therefore, a "volume's attribute" depends on response performance of a storage device (such as a hard disk drive device or a Solid State Drive (SSD)) that provides a storage area to the volume.

However, no technical approach has so far been proposed to allocate volumes having a suitable attribute for a type of middleware and the node type in the replication configuration to respective nodes.

The present invention has been made, taking the above-noted issue into consideration, and seeks to provide an information processing system and a volume allocation method for allocating volumes to respective nodes that carry out replication, respectively, the volumes having a suitable attribute for a type of middleware that is used by the nodes and the node type of the nodes in the replication configuration, thereby making it feasible to reduce overall system operation cost.

To provide a solution to a challenge discussed above, one aspect of the present invention resides in an information processing system where multiple nodes run which perform data read and/or write processing. The information processing system is provided with at least one compute server which configures at least one of the nodes or on which one or multiple ones of the nodes run, at least one storage node on which storage devices of plural types of drives having different levels of response performance are mounted respectively and at least one volume is created for which one of the storage devices of any drive type provides a storage area, and a controller node which controls the at least one compute server and the at least one storage node. Each of the nodes and another or other ones of the nodes constitute a replication group to carry out replication. The at least one storage node classifies the respective storage devices mounted thereon into plural storage hierarchies according to the drive type of each of the storage devices for management of the storage devices. The controller node allocates, to each node of the nodes, the at least one volume for which one of the storage devices of a storage hierarchy suitable for a type of middleware that the node uses and a node type of the node acting in the replication group provides a storage area.

Another aspect of the present invention resides in a volume allocation method that is performed in an information processing system where multiple nodes run which perform data read and/or write processing. The information processing system is provided with at least one compute server which configures at least one of the nodes or on which one or multiple ones of the nodes run, at least one storage node on which storage devices of plural types of drives having different levels of response performance are mounted respectively and at least one volume is created for which one of the storage devices of any drive type provides a storage area, and a controller node which controls the at least one storage node. Each of the nodes and another or other ones of the nodes constitute a replication group to carry out replication. The volume allocation method includes a first step in which the at least one storage node classifies the respective storage devices mounted thereon into plural storage hierarchies according to the drive type of each of the storage devices for management of the storage devices; and a second step in which the controller node allocates, to each node of the nodes, the at least one volume for which one of the storage devices of a storage hierarchy suitable for a type of middleware that the node uses and a node type of the node acting in the replication group provides a storage area.

According to the present information processing system and the volume allocation method, it is possible to allocate, to respective nodes constituting a replication group, virtual volumes of a suitable storage hierarchy for a type of middleware that are used by each of the nodes and the node type of each node acting in the replication group.

According to the present invention, it is possible to realize an information processing system and a volume allocation method making it feasible to reduce overall system operation cost.

BRIEF DESCRIPTION OF THE DRAWINGS

FIG. 5 is a diagram presenting an example of structure of a drive judgment table;

FIG. 6 is a diagram presenting an example of structure of a storage space management table;

FIG. 7 is a diagram presenting an example of structure of a compute server management table;

FIG. 8 is a diagram presenting an example of structure of a replication management table;

FIG. 15 is a flowchart illustrating a processing procedure of second reconfiguration processing.

DETAILED DESCRIPTION

Figure 1:
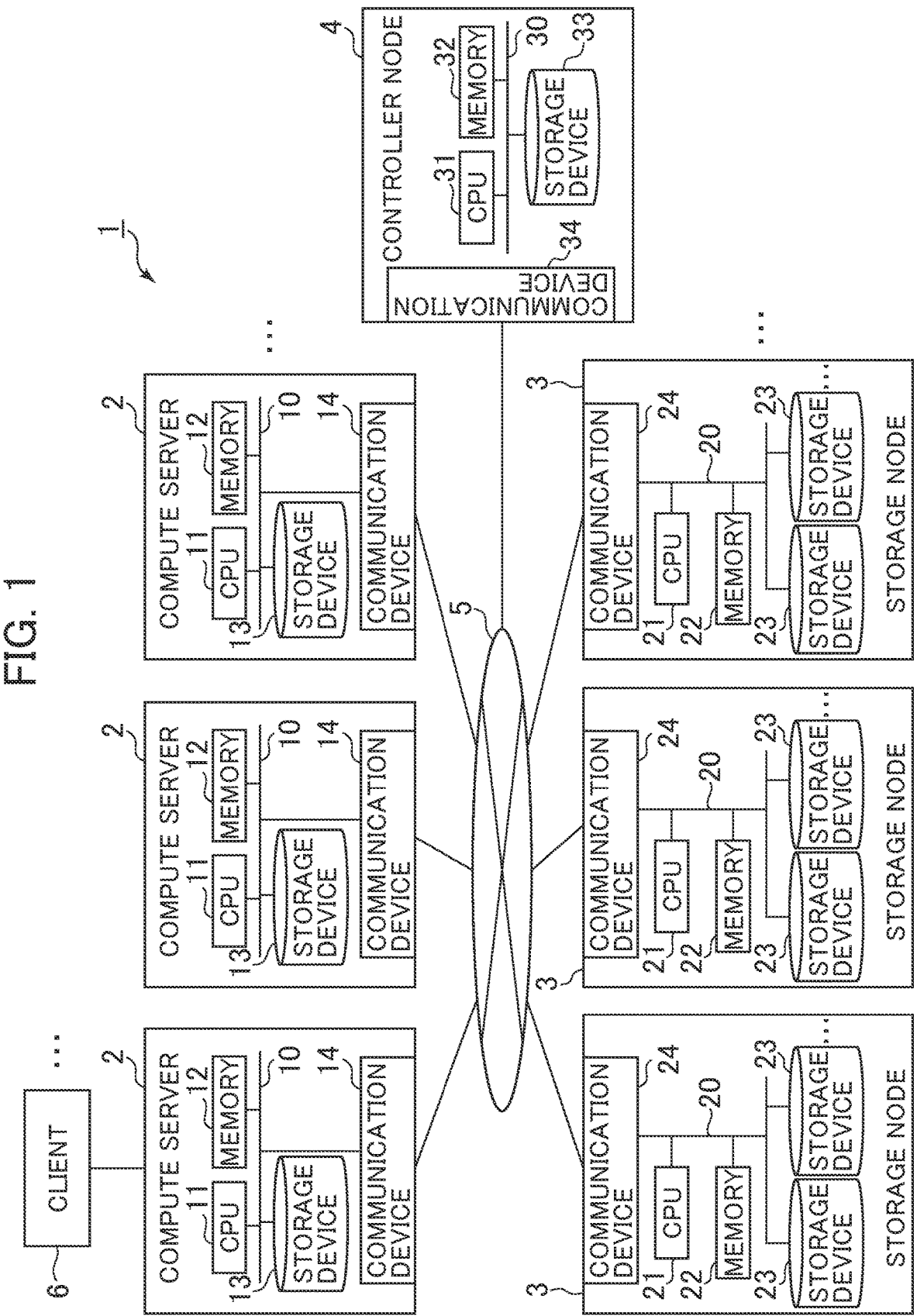
FIG. 1 is a block diagram depicting an overall structure of an information processing system according to an embodiment described herein.

In the following, one embodiment of the present invention will be detailed with respect to the drawings.

In the following, one embodiment of the present invention will be detailed with reference to the drawings. The following descriptions and the drawings are illustrative for the purpose of explaining the present invention and abbreviation and simplification are made, where appropriate, to clarify explanation. In addition, all combinations of features that are described in the embodiment are not always requisite for a solution offered by the present invention. The present invention is not limited to the embodiment and all application examples that conform to the concept of the present invention are included in the technical scope of the present invention. Various additions and modifications or the like to the present invention can be performed by those skilled in the art within the scope of the present invention. The present invention can also be implemented in other different embodiments. All components may be plural or single, unless otherwise noted definitively.

In the following descriptions, diverse pieces of information may be described with representations such as "tables", "lists", and "queues"; however, diverse pieces of information may be represented in a data structure other than those mentioned above. To express no dependence on a data structure, an "XX table", an "XX list", etc. may be termed as "XX information". When describing the contents of a database of information, terms such as "identifying information", "identifier", "name", "ID", and "number" may be used, but these terms can be replaced with each other.

Also, in the following descriptions, when describing elements of a same type without distinguishing them, reference designators or common numbers of reference designators are used. When describing elements of a same type, distinguishing them, the reference designators of the elements are used or IDs assigned to the elements may be used instead of the reference designators.

Also, in the following descriptions, processing that is implemented by executing a program may be described. A program is executed by at least one or more processors (e.g., a CPU), thereby implementing processing tasks which have been defined, while appropriately using a storage resource (e.g., a memory) and/or an interface device (e.g., a communication port) among others; therefore, an actor that performs processing may be regarded as a processor. Likewise, an actor that performs processing through program execution may be regarded as a controller, a device, a system, a computer, a node, a storage device, a server, an administrative computer, a client, or a host, all of which include a processor. An actor (e.g., a processor) that performs processing through program execution may include a hardware circuit that performs some or all of the processing. For example, an actor that performs processing through program execution may include a hardware circuit that carries out encryption and decryption or compression and decompression. A processor operates as a functional unit that implements predetermined functions by operating according to a program. A device and a system including a processor are a device and a system including these functional units.

A program may be installed into a device like a computer from a program source. A program source may be, e.g., a program distribution server or a computer-readable storage medium. If the program source is a program distribution server, the program distribution server may include a processor (e.g., a CPU) and storage resources and the storage resources may further store a distribution program and programs intended for distribution. As a result of executing the distribution program by the processor of the program distribution server, the processor of the program distribution server may distribute programs intended for distribution to other computers. Also, in the following descriptions, two or more programs may be implemented as one program or one program may be implemented as two or more programs.

(1) Information Processing System Configuration According to the Present Embodiment In FIG. 1, reference numeral 1 denotes an information processing system as a whole according to the present embodiment. This information processing system is comprised of one or multiple compute servers 2, one or multiple storage nodes 3, and a controller node 4, all of which are interconnected via a network 5.

A compute server 2 is a server device which functions as a host (a higher-level device) communicating with a storage node 3 and, in response to a read or write request which is given from a client 6, reads or writes requested data from/to the storage node 3 via the network 5.

This compute server 2 is comprised of a general-purpose server device equipped with one or more Central Processing Units (CPUs) 11, one or more memories 12, one or more storage devices 13, and one or more communication devices 14, all of which are connected via an internal network 10.

A CPU 11 is a processor which exerts overall control of operation of the compute server 2. A memory 12 is comprised of a volatile semiconductor memory such as a Dynamic RAM (Random Access Memory) (DRAM) or a Static RAM (SRAM) and is mainly used as a working memory for the CPU 11.

A storage device 13 is comprised of a non-volatile, large-capacity storage device such as, e.g., a hard disk drive device and a Solid State Disk (SSD) and is used to retain programs and control data for a long period. A program stored in the storage device 13 is loaded into the memory 12 upon startup of the compute server 2 or, when necessary, and various processing operations of the compute server 2 are performed through execution of this program by the CPU 11.

A communication device 4 is comprised of, e.g., a Network Interface Card (NIC) and performs protocol control when the compute server communicates with a storage node 3 or a controller node 4 via the network.

A storage node 3 is a physical server device which provides one or multiple ones of Software Defined Storage (DSS). However, a storage node 3 may be an ordinary storage device such as a disk array device. Also, it may be configured that a storage node 3 coexists with a compute server 2 on a same physical server.

A storage node 3 is equipped with one or more CPUs 21, one or more memories 22, multiple storage devices 23, and one or more communication devices 24, all of which are interconnected via an internal network 20. The functions and configurations of the CPUs 21, memories 22, and communication devices 24 are the same as the corresponding ones (CPUs 11, memories 12, or communications devices 4) of the compute servers 2 and, therefore, detailed description thereof is omitted here.

The storage devices 23 are comprised of plural types of drives having different levels of response performance, such as SSD, an Advanced Technology Attachment (ATA) hard disk drive device, and a Serial ATA (SATA) hard disk drive device. One or more storage devices 23 which are of the same type of drive (such as SSD, ATA hard disk drive device, or SATA hard disk drive device) are collectively managed as a pool.

In this case, all such pools are managed, sorting them into plural hierarchies (each of which will be hereinafter referred to as a storage hierarchy or Tier) by response performance of a drive type of storage devices 23 constituting one pool in such a way that a pool comprised of storage devices 23 of a drive type having the highest level of response performance is "Tier 1 (a first storage hierarchy)", a pool comprised of storage devices 23 of a drive type having the second highest level of response performance is "Tier 2 (a second storage hierarchy)", and so forth. Therefore, as for data for which response performance is required, by storing the data into a pool of higher storage hierarchy ("Tier" or "storage hierarchy" with a smaller ordinal), it is possible to carry out reading/writing the data more rapidly.

Now, in the following, the term "Tier" or "storage hierarchy" is not only used for pools, but also may be used for storage devices 23 constituting a pool and virtual volumes made belonging to a pool. For example, storage devices 23 of a drive type having the highest level of response performance and virtual volumes made belonging to a pool comprised of the storage devices 23 (a storage area is to be allocated from the pool) will be referred to as "Tier 1" or "first storage hierarchy" storage devices 23 or virtual volumes; and storage devices 23 of a drive type having the second highest level of response performance and virtual volumes made belonging to a pool comprised of the storage devices 23 will be referred to as "Tier 2" or "second storage hierarchy" storage devices 23 or virtual volumes.

The controller node 4 is a computer device which is used by an administrator of the present information processing system 1 when performing various setup and maintenance operations for a compute server 2 and a storage node 3. The controller node 4 is comprised of a general-purpose computer device equipped with one or more CPUs 31, one or more memories 32, one or more storage devices 33, and one or more communication devices 34, all of which are connected via an internal network 30. The functions and configurations of these CPUs 31, memories 32, storage devices 33, and communication devices 34 are the same as the corresponding ones (CPUs 11, memories 12, storage devices 13, or communications devices 14) of the compute servers 2 and, therefore, detailed description thereof is omitted here.

Figure 2:
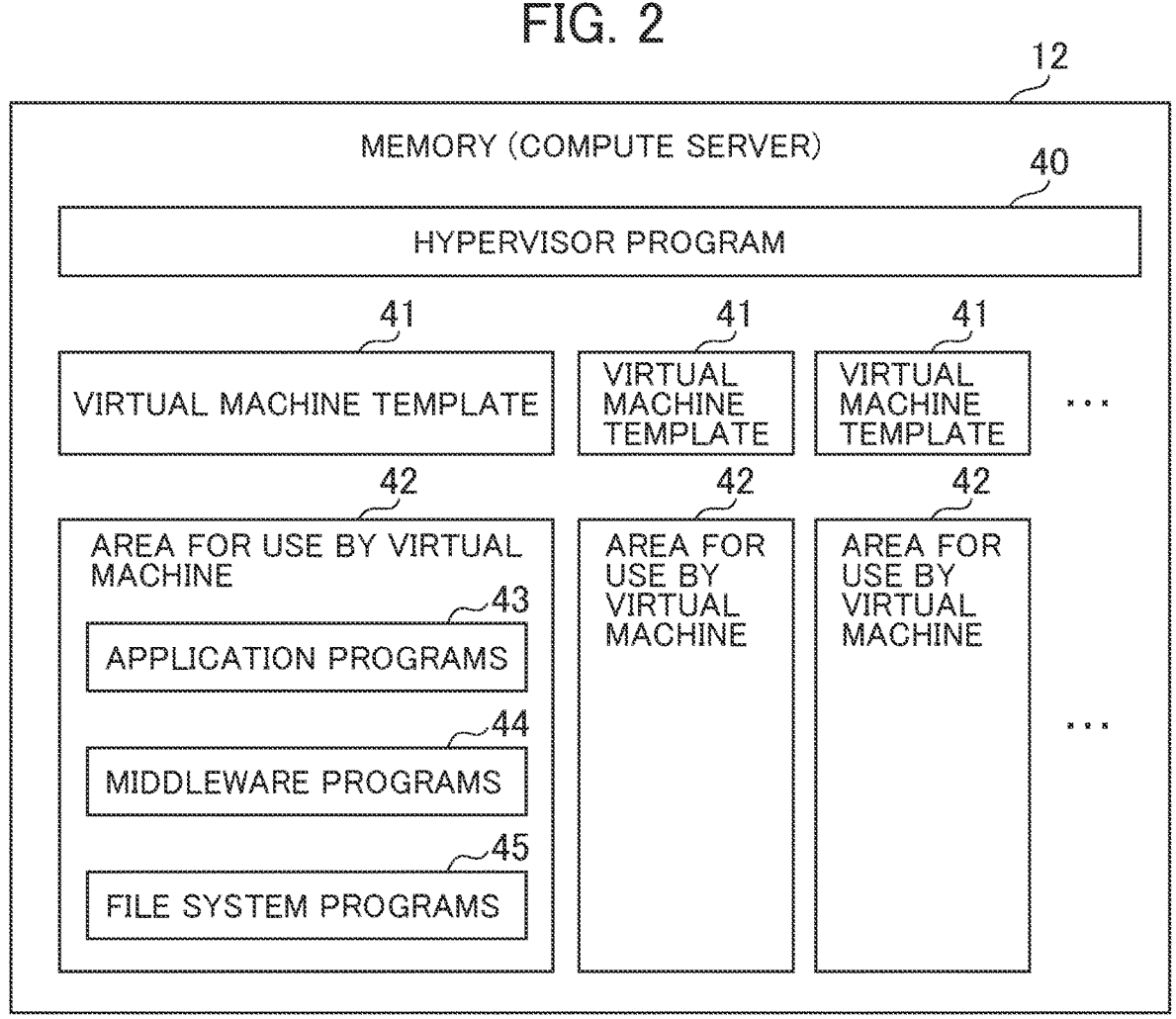
FIG. 2 is a block diagram depicting a logical structure of a memory of a compute server.

FIG. 2 depicts a logical configuration of a memory 12 of a compute server 2. As depicted in FIG. 2, a hypervisor program 40 and plural virtual machine templates 41 are stored in the memory 12 of the compute server 2. The hypervisor program 40 is a program having a function of virtualizing the compute server 2 and providing one or multiple virtual machines to the client 6. Therefore, in the case of the present information processing system 1, the client 6 is to issue a read or write request to a virtual machine.

In addition, a virtual machine template 41 is a template, prepared for each virtual machine, in which the virtual machine's OS (Operating System) type, CPU performance, and available memory space as well as a quantity of volumes to be allocated to the virtual machine and a type of middleware that the virtual machine uses among others are defined. Each compute server 2 holds virtual machine templates 41 for each of virtual machines which are to be created on the compute server 2 itself in the memory 12 and the hypervisor program 40 creates a virtual machine having a configuration and functions according to one of these virtual machine templates 41 and provides the virtual machine to the client 6.

Moreover, in the memory 12 of the compute server 2, an area 42 for use by virtual machine is reserved in a mapped manner to each virtual machine template 41. This area 42 for use by virtual machine is a memory area which is used by a virtual machine created using the corresponding virtual machine template 41 and has an amount of available space (memory space) defined in the virtual machine template 41.

In each area 42 for use by virtual machine, stored are necessary programs, respectively, such as application programs 43 and middleware programs 44 such as MongoDB and Neo4j which are used by a virtual machine created using the corresponding virtual machine template 41 as well as file system programs 45 which are used by the virtual machine to access files stored in a storage node 3.

Figure 3:
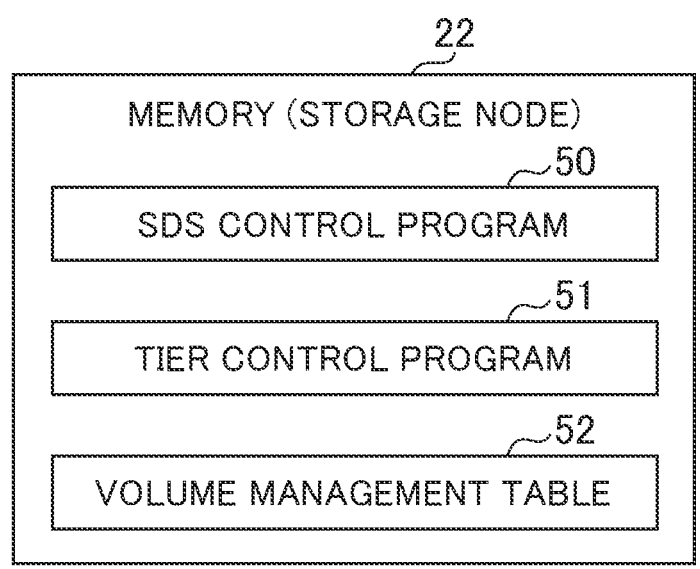
FIG. 3 is a block diagram depicting a logical structure of a memory of a storage node.

FIG. 3 depicts a logical configuration of a memory 22 of a storage node 3. As depicted in FIG. 3, in the memory 22 of the storage node 3, one or multiple SDS control programs 50, a Tier control program 51, and a volume management table 52 are stored.

An SDS control program 50 is a program which functions as a storage controller of SDS. The SDS control program 50 provides a virtual logical volume (which will be hereinafter referred to as a virtual volume) to a virtual machine. In response to a write request for the virtual volume from a virtual machine, the SDS control program 50 dynamically allocates a storage area from a pool to which the virtual volume is made to belong and stores data to write into the storage area. Also, in response to a read request for the virtual machine, the SDS control program 50 reads requested data from the pool to which the virtual volume is made to belong and transfers that data to the source virtual machine that transmitted the read request.

The Tier control program 51 has a function of managing the storage hierarchies of all pools created in the storage node 3 itself and, as necessary, moving data stored in a pool of one storage hierarchy to a pool of another storage hierarchy.

The volume management table 52 is a table which is used to manage virtual volumes created in the storage node 3 itself. Detail on the volume management table 52 will be described later.

(2) Volume Allocation Function

Then, a volume allocation function that is provided in the controller node 4 is described. In the information processing system 1 having the configuration described with regard to FIG. 1, some type of middleware programs 44 (FIG. 2) that virtual machines use and some replication configuration may cause a significant difference in the I/O (Input/Output) frequency with respect to each storage node 3 and each virtual volume. Hence, in view of cost reduction, there is a need to allocate virtual volumes of a suitable storage hierarchy for respective virtual machines and processes (nodes) to be executed by the virtual machines.

For example, let us consider the following case: middleware programs 44 that are used by virtual machines which are created based on virtual machine templates 41 described previously with regard to FIG. 2 are MongoDB and there is a replication configuration with one node called "Primary" which is a source of replication and two nodes called "Secondary" which replicate data, following the Primary. Now, each "Secondary" node is selected from among nodes existing in compute server s 2 which differ from each other, other than a compute server 2 in which the "Primary" node exists.

In this case, a write or read request from the client 6 (FIG. 1) is given to a node set up as "Primary". Upon having received a write request and data to write from the client 6, the "Primary" node accesses the corresponding storage node 3 via the network 5 and writes the data to write to a virtual volume allocated to a virtual machine created in that storage node 3.

In conjunction with this, additionally, the "Primary" node transfers that data to the respective nodes set up as "Secondary". Then, upon having received this data, the "Secondary" nodes write the received data to virtual volumes allocated to them.

On the other hand, upon having received a read request from the client 6, the "Primary" node accesses the corresponding storage node 3 via the network, reads requested data from a virtual volume allocated to the node in the storage node 3, and transfers the read data to the source client 6 that transmitted the read request.

In this way, in a MongoDB replica set, a random read and a sequential write are performed for virtual volumes allocated to the "Primary" node, whereas a sequential write is only performed for virtual volumes allocated to "Secondary" nodes. However, this is one example of configuration.

Therefore, in the case of the configuration example as described above, a high level of response performance is required for virtual volumes which are allocated to the "Primary" node, whereas so high level of response performance is not required for virtual volumes which are allocated to the "Secondary" nodes. So, it is desirable to allocate a virtual volume for which a storage area is provided from a pool comprised of storage devices 23 whose drive type has a high level of response performance, though being expensive and allocate a virtual volume for which a storage area is provided from a pool comprised of storage devices 23 whose drive type has a non-high level of response performance, but is less costly.

The above description is also true for a case where the nodes use Neo4j as middleware programs 44. For example, in the case of Neo4j, Master-Slave scheme replication can be set up and, in a classic setup in this case, a "Master" node processes a write request and a "Slave" node processes a read request. Therefore, in Neo4j, a high level of response performance is required for virtual volumes which are allocated to a "Slave" node, whereas so high level of response performance is not required for virtual volumes which are allocated to a "Master" node. Now, in the following, a collection of nodes that carry out the same replication will be referred to as a "replication group".

As described above, in the present information processing system 1, it is desirable to allocate, to respective nodes constituting a replication group, virtual volumes of a suitable storage hierarchy for a type of middleware programs 44 that are used by the nodes and the node type of each of the nodes acting in the replication, in terms of cost reduction as well. However, no technical approach has so far been proposed to allocate, to respective nodes constituting a replication group, virtual volumes of a suitable storage hierarchy for a type of middleware programs 44 that are used by the nodes and the node type of each of the nodes.

Therefore, in the information processing system 1 according to the present embodiment, the volume allocation function exists in the controller node 4. When starting up nodes constituting a replication group, this function allocates, to the nodes, virtual volumes of a suitable storage hierarchy for a type of middleware programs 44 that are used by the nodes and the node type of each of the nodes acting in the replication configuration.

In particular, the controller node 4 so controls compute servers 2 and storage nodes 3 as to allocate a virtual volume of a highest storage hierarchy to a node for which a higher level of response performance is required, such as "Primary" in MongoDB or "Master" in Neo4j, and allocate a virtual volume of a lower storage hierarchy to a node for which a so high level of response performance is not required, such as "Secondary" in MongoDB or "Master" in Neo4j. Additionally, the controller node 4 selects a virtual volume to be allocated to each node out of virtual volumes created within a storage node in which the largest amount of free space of the corresponding storage hierarchy exists.

Meanwhile, e.g., MongoDB standards prescribe the following function: in a case where a fault has occurred in a compute server 2 on which a "primary" node runs or a storage node 3 that provides a virtual volume allocated to a "primary" node, the function upgrades one of "secondary" nodes to "primary" automatically.

Because of this, in a case where the respective nodes in the present information processing system 1 use MongoDB as middleware that the nodes use and, if virtual volumes allocated to the nodes are stationary, virtual volumes of a low storage hierarchy which are allocated to a node upgraded to "Primary", when the node is "Secondary", remain as is allocated to the node; this poses a problem in which a decrease occurs in response performance of the present information processing system 1 viewed from the client 6 (FIG. 1).

Therefore, in the information processing system 1 according to the present embodiment, a reconfiguration function exists in the controller node 4; in a case where a fault has occurred in any compute server 2 or storage node 3 within the present information processing system 1, this function so controls compute servers 2 and storage nodes 3 to change virtual volumes allocated to nodes to virtual volumes of a suitable storage hierarchy. Nodes that must be subjected to this change depend on what is the fault.

In actuality, when having detected a fault of a compute server 2 on which a node runs that is set as a replication source in a replication group, the controller node 4 decides whether or not virtual volumes being allocated to a node upgraded to a replication source due to the fault occurrence are virtual volumes of a storage hierarchy that should be allocated to a replication source in the replication group. If a result of this decision is No, the controller node 4 allocates the virtual volumes so far allocated to the replication source node to a new node existing in a new compute server 2, activates the new node as a replication destination in the replication group, and then upgrades the node to a replication source. Now, a "new compute server" termed here refers to a compute server 2 in which any of nodes constituting the replication group does not exist and a "new node" refers to a node that does not belong to the replication group. This is also true for the following context.

In addition, when having detected a fault of a storage node 3 that provides virtual volumes allocated to a node that is set as a replication source in a replication group, the controller node 4 also decides whether or not virtual volumes being allocated to a node upgraded to a replication source due to the fault occurrence are virtual volumes of a storage hierarchy that should be allocated to a replication source in the replication group in the same manner as described above. If a result of this decision is No, the controller node 4 modes data stored in the virtual volumes to a pool of a storage hierarchy of which virtual volumes should be allocated to a replication source node, allocates new virtual volumes to a new node existing in a new compute server 2 to maintain redundancy, and activates the new node as a new replication destination in the replication group. Now, "new virtual volumes" termed here refers to virtual volumes that are not allocated to any of nodes in the replication group. This is also true for the following context.

On the other hand, when having detected a fault of a compute server 2 on which a node runs that is set as a replication destination in a replication group, the controller node 4 allocates virtual volumes allocated to the node to a new node existing in a new compute server 2 and activates the new node as a new replication destination in the replication group.

In addition, when having detected a fault of a storage node 3 that provides virtual volumes allocated to a node that is set as a replication destination in a replication group, the controller node 4, allocates new virtual volumes to a new node existing in a new compute server 2 and activates the new node as a new replication destination in the replication group.

As means for implementing the volume allocation function and the reconfiguration function in the present embodiment as described above, in the memory 32 of the controller node 4, a middleware deployment program 60, a volume creation program 61, a fault detection program 62, and a reconfiguration program 63 are stored as programs and a drive judgment table 64, a storage space management table 65, a compute server management table 66, and a replication management table 67 are stored as control information.

When a command to deploy nodes in which operation conditions such as a type of middleware programs 44 and a replication configuration is specified is issued from the administrator, the middleware deployment program 60 is a program having a function of establishing an environment satisfying the specified operation conditions and deploying the nodes together with the middleware programs 44.

In addition, when the middleware deployment program 60 deploys nodes, the volume creation program 61 is a program having a function of creating virtual volumes that should be allocated to the nodes to be deployed and allocating the virtual volumes to the nodes.

The fault detection program 62 is a program having a function of monitoring all compute servers and all storage nodes in the present information processing system 1 and detecting a fault, when having occurred in any compute server 2 or storage node. Furthermore, the reconfiguration program 63 is a program having a function of performing a necessary reconfiguration of a replication configuration depending on what is the fault detected by the fault detection program 62.

Meanwhile, the drive judgment table 64 is a table in which the number of nodes set as either a replication source or a replication destination and the drive type of storage devices 23 (FIG. 1) to be allocated respectively to each node which is either a replication source or a replication destination are specified with respect to each type of middleware programs 44. This drive judgment table 64 is created in advance by the administrator or the like of the present information processing system 1 and stored in the memory 32 of the controller node 4.

As presented in FIG. 5, the drive judgment table 64 is configured with the following columns: middleware type 64A, node class 64B, the number of nodes 64C, node type 64D, and drive type 64E. The middleware type column 64A stores all types of middleware programs 44 (FIG. 2) such as MongoDB and NeO4j that can be used by the nodes in the present information processing system 1.

A cell of the node class column 64B stores a class associated with a node type (this class will be hereinafter referred to as a node class) that is specified for each type of middleware programs 44. In the present embodiment, a node that is of a node type for which a higher level of response performance is required, such as "Primary" in MongoDB and "Slave" in Neo4j is classified with a first class. A node that is of a node type for which response performance on a lower level than a node of the first class will surface is classified with a second class. In this manner, a node class associated with each node type is determined respectively so that a node type to which virtual volumes of a higher storage hierarchy should be allocated will be classified with a higher class (a class with a smaller ordinal).

A cell of the number of nodes column 64C stores the number of nodes to be set for the node type of the corresponding node class with respect to each type of middleware programs 44 and in the replication configuration. A cell of the node type column 64D stores a node type classified with the corresponding node class. Moreover, a cell of the drive type column 64E stores the drive type of storage devices 23 which constitute a pool to which virtual volumes to be allocated to a node of the node type classified with the corresponding node class are made to belong (that is, the storage devices 23 provide a storage area to the node classified with the corresponding node class).

In the case of an example of FIG. 5, thus, the table specifies the following: in a replication configuration of nodes that use middleware programs 44 whose type is "middleware 1", a node as "one" whose node type is set as "Primary" is classified with a "first class" as its node class and virtual volumes made to belong to a pool comprised of "SSD" devices are to be allocated to the node of the first class; nodes as "remains" whose node type is set as "Secondary" are classified with a "second class" as their node class and virtual volumes made to belong to a pool comprised of "HDD (hard disk drive devices)" are to be allocated to the nodes of the second class.

Now, the example of FIG. 5 illustrates a case where there are only two drive types of storage devices 23: "SSD" and ""HDD (hard disk drive devices)"; however, there may be three or more drive types.

The storage space management table 65 is a table that the controller node 4 uses to manage aggregate amounts of free space available on storage devices 23 per drive type in respective storage nodes 3 existing in the present information processing system 1 and, as presented in FIG. 6, the table is configured with the following columns: storage node ID 65A, drive type 65B, and free space 65C.

A cell of the storage node ID column 65 stores an identifier unique to a storage node 3 (a storage node ID), respectively assigned to each of the storage nodes 3 existing in the present information processing system 1. FIG. 6 illustrates a case where, as such storage node IDs, serial numbers starting from "1" are assigned to the respective storage nodes 3.

Cells of the drive type column 65B associated with one storage node ID in the storage node ID column 65A store the drive types of all storage devices 23 mounted on the corresponding storage node. A cell of the free space column 65C associated with one drive type stores an aggregate amount of free space available on storage devices 23 of the corresponding drive type mounted on the corresponding storage node 3.

In the case of an example of FIG. 6, thus, the table illustrates the following: as for a storage node 3 assigned a storage node ID of "1", storage devices 23 whose drive type is "SSD" and storage devices 23 whose drive type is "HDD (hard disk drive device)" are mounted on the node and in addition, an aggregate amount of free space on the "SDD" devices is "1500 GB" and an aggregate amount of free space on the "HDD" devices is "10000 GB".

Now, FIG. 6 illustrates a case where the respective storage nodes 3 are equipped with only two drive types of storage devices 23: "SSD" and ""HDD (hard disk drive devices)"; however, storage devices 23 of other drive types than "SSD" and ""HDD (hard disk drive devices)" may be mounted as part of storage devices 23 on the respective storage nodes 3, as noted previously with regard to FIG. 5.

The compute server management table 66 is a table that the controller node 4 uses to manage compute servers 2 existing in the present information processing system 1 and, as presented in FIG. 7, the table is configured with the following columns: compute server ID 66A, virtual machine ID 66B, process ID 66C, middleware type 66D, node type 66E, storage node ID 66F, volume ID 66G, and drive type 66H.

A cell of the compute server ID column 66A stores an identifier unique to a compute server 2 (a compute server ID), assigned to each of the compute servers 2 existing in the present information processing system 1. FIG. 7 illustrates a case where, as such compute server IDs, serial numbers starting from "1" are assigned to the respective compute servers 2.

The virtual machine ID column 66B has separate cells, each of which is mapped to each of virtual machines running on the corresponding compute server 2, and each of these separate cells respectively stores an identifier unique to a virtual machine (virtual machine ID), assigned to each of the virtual machines. FIG. 7 illustrates a case where, such virtual machine IDs, numbers that are unique only within an individual compute server 2 are assigned to the respective virtual machines, respectively.

The process ID column 66C has separate cells, each of which is mapped to each of processes to be executed on the corresponding virtual machine, and each of these separate cells respectively stores an identifier unique to a process (process ID), assigned to each of the processes to be executed on the corresponding virtual machine. FIG. 7 illustrates a case where, such process IDs, numbers that are unique only within an individual compute server 2 are assigned to the respective processes, respectively.

The middleware type column 66D also has separate cells, each of which is mapped to each of processes to be executed on the corresponding virtual machine, and each of these separate cells respectively stores a type of middleware programs 44 (FIG. 3) (such as MongoDB or Neo4j) that the corresponding virtual machine uses.

The node type column 66E also has separate cells, each of which is mapped to each of processes to be executed on the corresponding virtual machine, and each of these separate cells stores the node type of the corresponding node (virtual machine or process).

For instance, if middleware programs 44 are of MongoDB, as node types, there are two types: "Primary" which processes I/O requests from the client 6 (FIG. 1) and acts as a replication source for replication and "Secondary" which is a replication destination for the replication, as described previously. Either of these "Primary" and "Secondary" types is stored in each cell, respectively. If middleware programs 44 are Neo4j, as node types, there are two classes: "Master" which processes I/O requests from the client 6 and acts as a replication source for replication and "Slave" which is a replication destination for the replication. So, either of these "Master" and "Slave" types is stored in each cell, respectively.

The volume ID column 66G and the storage node ID column 66F also have separate cells, each of which is mapped to each of processes to be executed on the corresponding virtual machine, and each of these cells stores the virtual volume ID of a virtual volume allocated to the corresponding node (virtual machine or process) (in the volume ID column 66G) and the storage node ID of a storage node 3 which provides that virtual volume (in the storage node ID column 66F).

Furthermore, the drive type column 66H also has separate cells, each of which is mapped to each of processes to be executed on the corresponding virtual machine, and each of these cells respectively stores the drive type of storage devices 23 which provide a storage area to the virtual volume allocated to the corresponding node (storage devices 23 which constitute a pool to which the virtual volume allocated to the node is made to belong).

In the case of an example of FIG. 7, thus, the table illustrates the following: on a compute server 2 assigned a compute server ID of "1", a virtual machine assigned a virtual machine ID of "1" runs using middleware programs 44 labeled "middleware 1" and this virtual machine executes at least a process assigned a process ID of "1" and whose node type is "Primary" and a process assigned a process ID of "2" and whose node type is "Primary".

In addition, FIG. 7 also illustrates the following: a virtual volume with a volume ID of "1", which is made to belong to a pool comprised of "SSD" devices in a storage node 3 assigned a storage node ID of "1", is allocated to the above process assigned a process ID of "1" and a virtual volume with a volume ID of "41", which is made to belong to a pool comprised of "SSD" devices in a storage node 3 assigned a storage node ID of "4", is allocated to the above process assigned a process ID of "2".

The replication management table 67 is a table that the controller node 4 uses to manage replications (setup thereof) established in the information processing system 1 and, as presented in FIG. 8, the table is configured with a replication ID column 67A and multiple class columns 67B.

A cell of the replication ID column 67A stores an identifier unique to a replication (setup thereof) (a replication ID), assigned to each of replications (setup thereof).

The class columns 67B are provided in a mapped manner to each of node classes in the replication configuration of the corresponding replication (setup thereof). These class columns 67B is each divided into the following columns: compute server ID 67BA, node ID 67BB, and process ID 67BC. As for a class column 67B mapped to a node class into which two or more nodes are set, the columns of compute server ID 67BA, node ID 67BB, and process ID 67BC have separate row cells, each of which is mapped to each of nodes constituting the node class.

A cell of the compute server ID column 67BA stores, if a node set classified with the first class in the corresponding replication (setup thereof) is a virtual machine, the compute server ID of a compute server 2 in which the virtual machine exists, and if such node is a process, the compute server ID of a compute server 2 in which a virtual machine executing the process exists.

A cell of the virtual machine column 67BB stores, if the corresponding node is a virtual machine, the virtual machine ID, and if that node is a process, the virtual machine ID of a virtual machine executing the process. Moreover, a cell of the process ID column 67BC stores, if the corresponding node is a virtual machine, none of information, and if the corresponding node is a process, the process ID of the process.

In the case of an example of FIG. 8, thus, the table illustrates the following: in a replication (setup thereof) assigned a replication ID of "replication 1", a node of the first class is a process with a process ID of "1" that is executed by a virtual machine assigned a virtual machine ID of "1" running on a compute server 2 assigned a compute server ID of "1" and a node of the second class consists of a process with a process ID of "4" that is executed by a virtual machine assigned a virtual machine ID of "2" running on a compute server 2 assigned a compute server ID of "2" and a process with a process ID of "2" that is executed by a virtual machine assigned a virtual machine ID of "1" running on a compute server 2 assigned a compute server ID of "4".

Figure 9:
FIG. 9 is a diagram presenting an example of structure of a volume management table.

The volume management table 52 (FIG. 3) is a table that a storage node 3 uses to manage virtual volumes existing in the present information processing system 1 and, as presented in FIG. 9, the table is configured with the following columns: volume ID 52A, page ID 52B, and Tier 52C.

A cell of the volume ID column 52A stores an identifier (volume ID) of each of virtual volumes existing in the present information processing system 1. The page ID column 52B and the Tier column 52C have separate cells, each of which is mapped to each of pages within the corresponding virtual volume. Each of the separate cells in the page ID column 52B respectively stores an identifier (page ID) unique to a page assigned to the corresponding page and each of the separate cells in the Tier column 52C respectively stores the storage hierarchy of a storage area (the storage hierarchy of a pool that provides the storage area) allocated to the corresponding page within the corresponding volume.

Therefore, an example of FIG. 9 illustrates that a storage area from a pool of storage hierarchy "Tier 1" is allocated respectively to all pages with page IDs "1" to "3" of a virtual volume with a volume ID "1".

Figure 4:
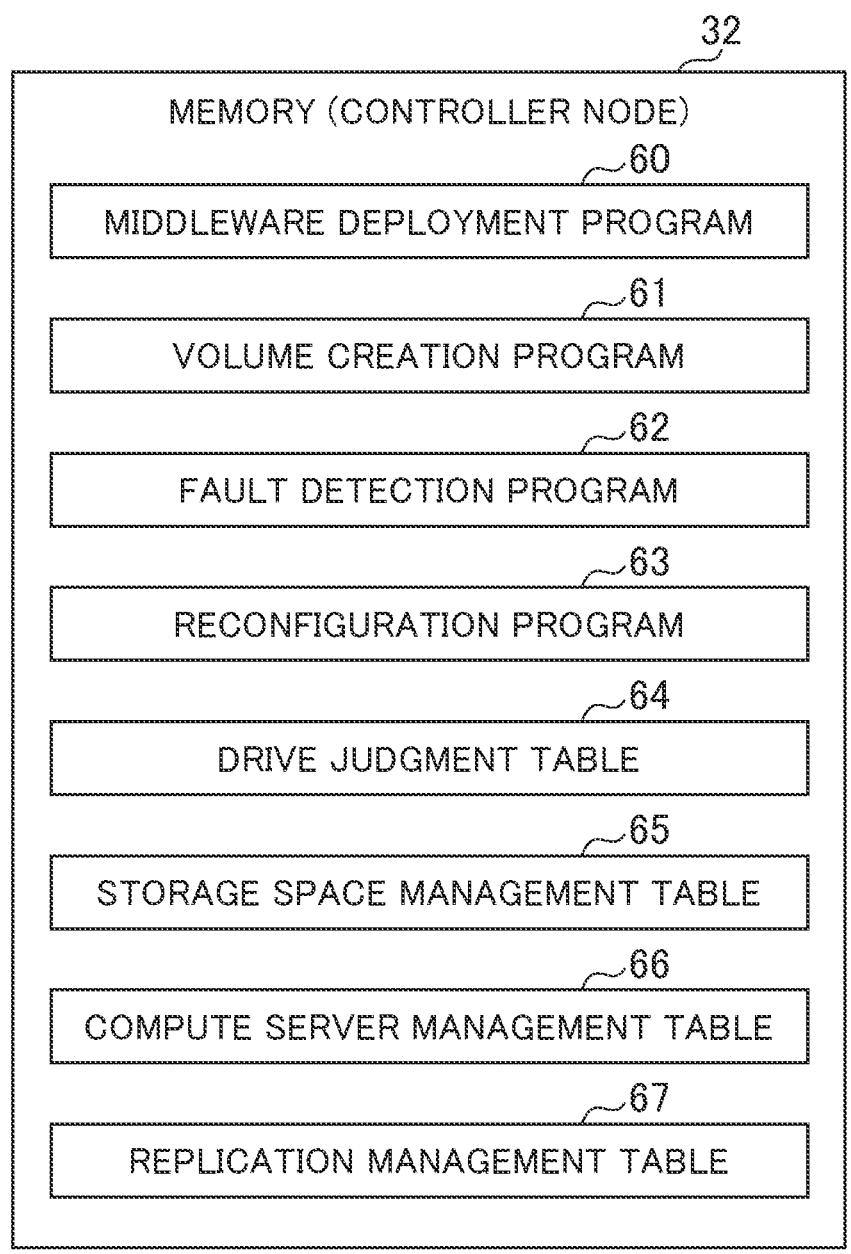
FIG. 4 is a block diagram depicting a logical structure of a memory of a controller node.

(3) Respective Processing Procedures in Relation to the Volume Allocation Function and the Reconfiguration Function According to the Present Embodiment Then, in relation to the above-noted volume allocation and reconfiguration functions according to the present embodiment, the following describes details of processing procedures which are respectively performed by the middleware deployment program 60, volume creation program 61, fault detection program 62, and reconfiguration program 63 in the controller node 4, which are described with respect to FIG. 4.

(3-1) Replication Setup Processing

Figure 10:
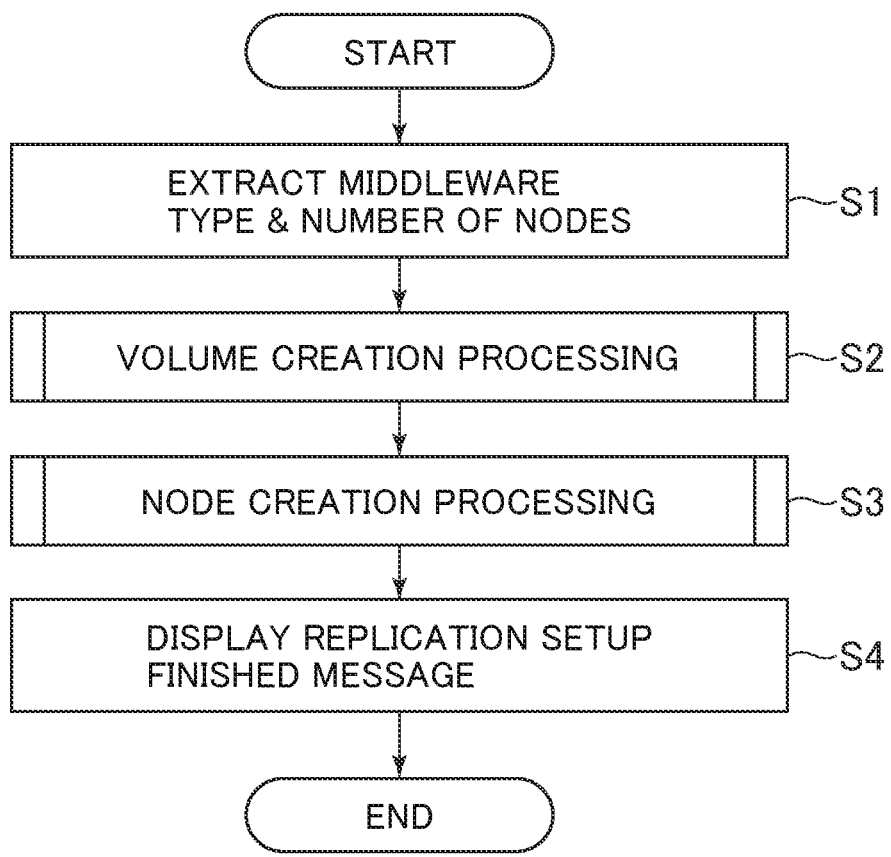
FIG. 10 is a flowchart illustrating a processing procedure of middleware deployment processing.

FIG. 10 illustrates processing detail of replication setup processing which is performed by the middleware deployment program 60 (FIG. 4) in the controller node 4 in relation to the volume allocation function.

When a command to set up replication (which will be hereinafter referred to as a replication setup command) is given by an administrator by operating the controller node 4 the middleware deployment program 60 starts this replication setup processing illustrated in FIG. 10. In this replication setup command, included are environment conditions for the replication, such as the number of nodes constituting a replication group that carries out the replication, the number of node types of the nodes, and a type of middleware that each of the nodes uses.

Upon starting the replication setup processing, the middleware deployment program 60 first extracts the number of nodes (the number of nodes constituting a replication group) to carry out the replication and the type of middleware programs 44 that each of these nodes uses, which should be set up currently, from the environment conditions specified in the replication setup command (S1).

Then, based on the number of nodes and the type of middleware programs 44 extracted at step S1, the middleware deployment program 60 creates virtual volumes to be allocated, respectively, to the nodes that carry out the requested replication within respective different storage nodes 3 (S2).

Next, the middleware deployment program 60 creates nodes as many as the number of nodes extracted at step 1 in respective different compute servers 2, respectively, and, to each node thus created, allocates a virtual volume having an attribute suited for the type of the node out of the virtual volumes created at step 2, respectively; after that, the program starts up these nodes (S3).

Then, the middleware deployment program 60 displays a message that replication setup as specified in the replication setup command has finished (S4) and, after that, terminates this replication setup processing.

(3-2) Volume Creation Processing

Figure 11:
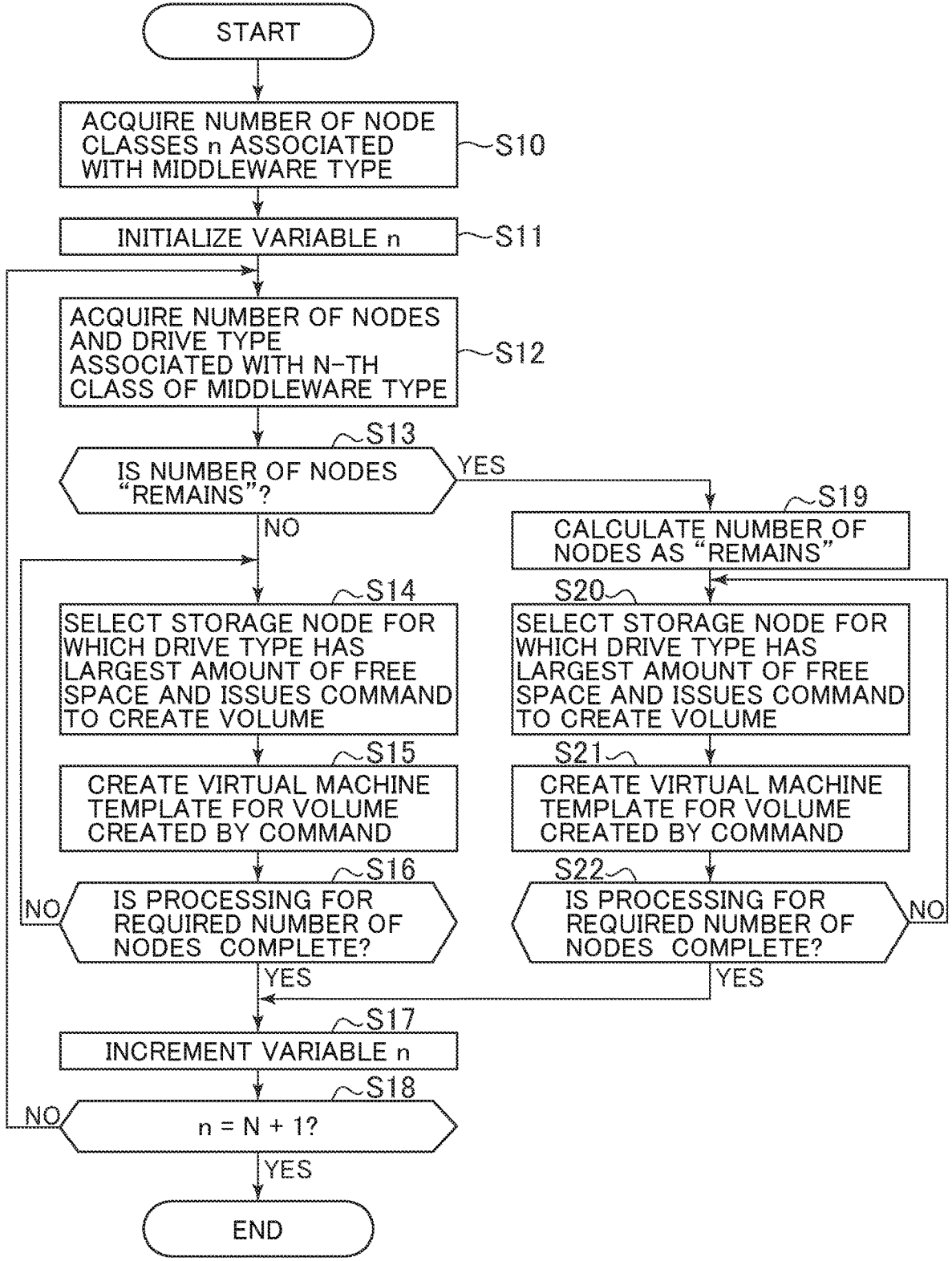
FIG. 11 is a flowchart illustrating a processing procedure of volume location decision processing.

FIG. 11 illustrates processing detail of volume creation processing which is performed by the middleware deployment program 60 at step S2 of the replication setup processing described above with regard to FIG. 10.

The middleware deployment program 60 starts this volume creation processing illustrated in FIG. 11, when proceeding to step S2 in the replication setup processing. Referring to the drive judgment table 64 (FIG. 5), the middleware deployment program 60 first acquires the number of node classes N associated with the type of middleware programs 44 specified in the replication setup command (this type will be hereinafter referred to as the specified middleware type) (S10).

For instance, in the case of an example of FIG. 5, if the specified middleware type is "middleware 1", "middleware 1" is classified into a "first class" and a "second class" and, therefore, the number of node classes of "2" is acquired; if the specified middleware type is "middleware 3", "middleware 3" is classified into a "first class", a "second class", and a "third class" and, therefore, the number of node classes of "3" is acquired.

Then, the middleware deployment program 60 resets a variable n (sets n to "1") (S11). Additionally, referring to the drive judgment table 64 (FIG. 5), the middleware deployment program 60 acquires the number of nodes and the drive type associated with the n-th class of the specified middleware type from the drive judgment table 64 (S12). For instance, in the example of FIG. 5, if the specified middleware type is "middleware 1", because n is "1" at this point, associated with the first class of "middleware 1", the number of nodes of "1" and the drive type "SSD" will be acquired. Now, in a case where the specified middleware type is not registered in the drive judgment table 64, the number of nodes associated with the n-th class of the specified middleware type may be defaulted to the number of nodes (e.g., 1) which has been set in advance for all classes and the drive type may be defaulted to a drive type having the highest level of response performance for all classes.

Next, the middleware deployment program 60 decides whether or not the number of nodes acquired at step S12 is "remains" (S13). When a result of this decision is No, the middleware deployment program 60 creates, within a storage node 3 for which the drive type acquired at step S12 has the largest amount of free space, a virtual volume to be made to belong to a pool comprised of storage devices (FIG. 1) of the drive type (S14).

In particular, referring to the storage space management table 65, the middleware deployment program 60 selects a storage node 3 for which the drive type acquired at step S12 has the largest amount of free space. Additionally, to the SDS control program 50 (FIG. 3) in the selected storage node, the middleware deployment program 60 issues a command to create a virtual volume which should be made to belong to a pool comprised of storage devices 23 (FIG. 1) of the drive type acquired at step S12. When doing so, the middleware deployment program 60 specifies a quantity of the virtual volume to be created currently as well.

In turn, the SDS control program 50 having received this command creates a virtual volume having a requested quantity, making it belong to a pool comprised of storage devices 23 of the specified drive type.

Next, the middleware deployment program 60 selects one compute server 2. As a compute server 2 to be selected at this time, for example, it is allowed to apply a compute server 2 under the least load at the current point of time or a compute server 2 on which the number of running virtual machines is least. Then, the middleware deployment program 60 creates a virtual machine template 41 (FIG. 2) for the virtual volume created by the command issued at step S14 and gives the created virtual machine template 41 to the compute server 2 (S15). In turn, the compute server 2 having received this virtual machine template 41 stores the virtual machine template 41 into the memory 12 (FIG. 1) and reserves an area 42 for use by virtual machine (FIG. 2) mapped to the virtual machine template 41 in the memory 12.

Then, the middleware deployment program 60 decides whether or not processing of steps S14, S15 has been executed by the number of times as many as the number of nodes acquired at step S12 (S16). When a result of this decision is No, the middleware deployment program 60 returns to step 13 and repeats the processing of steps S14 through S16.

Eventually, when the middleware deployment program 60 has executed the processing of steps S14, S15 by the number of times as many as the number of nodes acquired at step S12 and the step S16 returns a Yes result, it increments the variable (increments the value of n by one) (S17). Additionally, the middleware deployment program 60 decides whether or not the value of n has become larger than the number of node classes N acquired at step S10 (whether or not n has become N+1) (S18).

When a result of this decision is No, the middleware deployment program 60 returns to step S12 and repeats the processing of step S12 and subsequent steps. Eventually, when the middleware deployment program 60 finishes the execution of processing of step S12 and subsequent steps by the number of times as many as the number of classes N acquired at step S10, when the step S18 returns a Yes result, it terminates this volume creation processing.

Otherwise, if a result of the decision at step S13 is Yes, the middleware deployment program 60 calculates the number of nodes as "remains" (S19). In particular, the middleware deployment program 60 calculates the number of nodes as "remains" by subtracting a total number of nodes in all classes for which the processing has been done before the class which is a target of current processing (this class will be hereinafter referred to as the target class) from the number of nodes acquired at step S1 of the replication setup processing described previously with regard to FIG. 10. When doing so, a "total number of nodes in the respective classes processed before the target class is acquired from the drive judgment table 64 (FIG. 5).

Then, the middleware deployment program 60 executes the steps S20 through S22 in the same way as for the steps S14 through S16, thereby creating a virtual volume and a virtual machine template 41 for each of the nodes in the target class respectively (S20 through S22).

When the middleware deployment program 60 finishes the creation of virtual volumes and virtual machine templates 41 for the respective nodes of the target class, when the step S22 returns a Yes result, it proceeds to step S17 and then executes the processing of step S17 and subsequent steps, as described previously.

(3-3) Node Creation Processing

Figure 12:
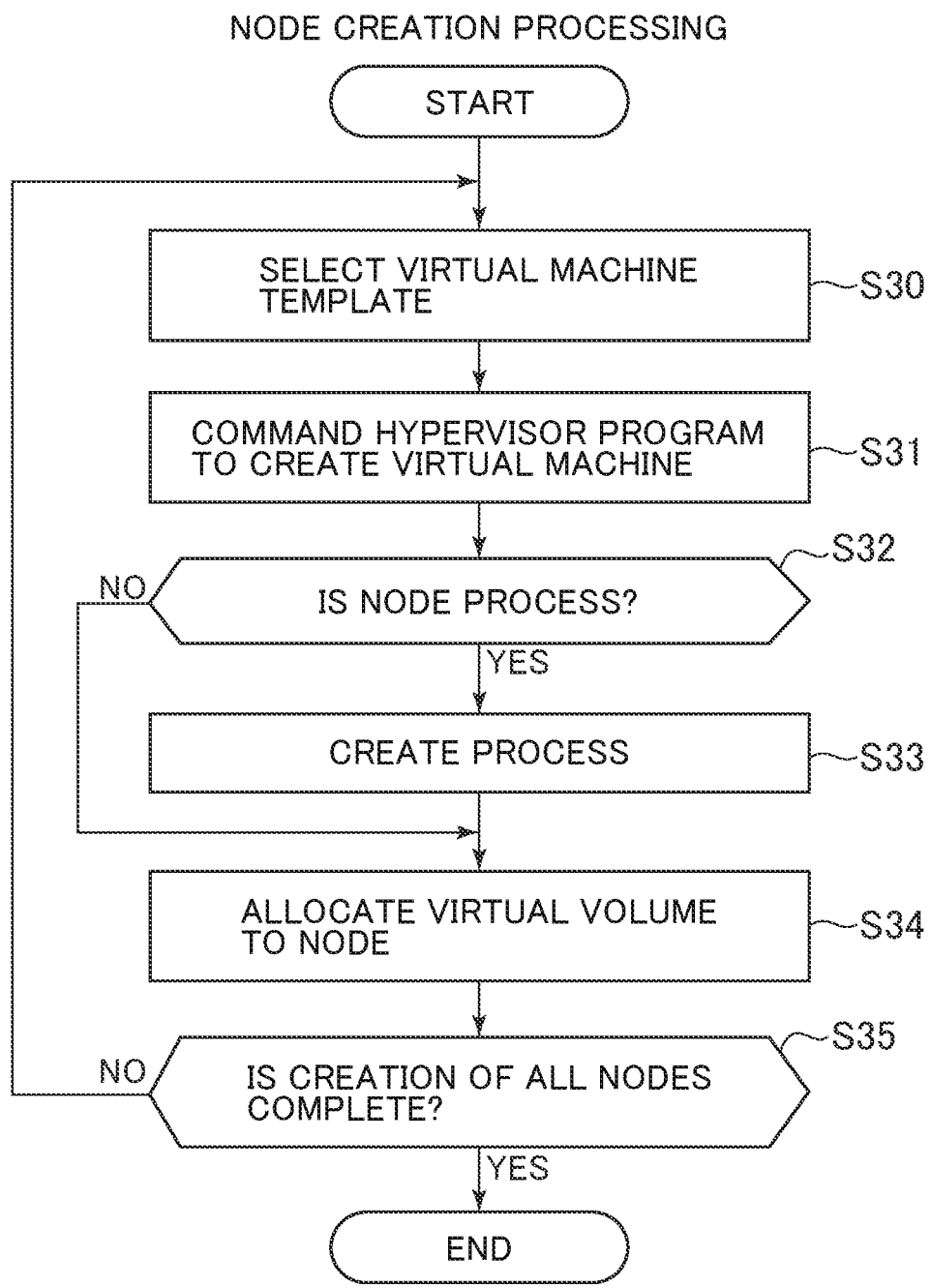
FIG. 12 is a flowchart illustrating a processing procedure of virtual machine creation processing.

Meanwhile, FIG. 12 illustrates processing detail of node creation processing which is performed by the middleware deployment program 60 at step S3 of the replication setup processing described previously with regard to FIG. 10.

The middleware deployment program 60 starts this node creation processing illustrated in FIG. 12, when proceeding to step S3 in the replication setup processing. First, the middleware deployment program 60 selects one virtual machine template 41 for which step 31 and subsequent steps have not yet been executed from among the virtual machine templates 41 for appropriate storage nodes 3 stored at step S15 and step S21 of the volume creation processing (S30).

Then, the middleware deployment program 60 issues a command to create a virtual machine using the virtual machine template 41 selected at step S30 to the hypervisor program 40 (FIG. 2) in a compute server 2 which stores the virtual machine template 41 selected at step S30 (S31). The compute server 2 thus given this command creates a virtual machine using the specified virtual machine template 41. Also, the middleware deployment program 60 registers necessary information for the virtual machine into the compute server management table 66 (FIG. 7) and the replication management table 67 (FIG. 8).

Next, the middleware deployment program 60 decides whether or not the node to be created currently is a process (S32). This decision is made based on a replication setup command given from the controller node 4 at the current point of time.

When a result of this decision is No, the middleware deployment program 60 then proceeds to step S34. When a result of this decision is Yes, the middleware deployment program 60 issues a command to create a process to be executed by the virtual machine created at step S31 to a storage node 3 that solicited creation of the virtual machine (S33).

After that, the middleware deployment program 60 issues a command to allocate the virtual volume which has last been created by the volume creation processing (FIG. 11) to the virtual machine created at step S31, if the node is the virtual machine, or the process created at step S33, if the node is process, to the corresponding compute server 2 and storage node 3 (S34).

Then, the middleware deployment program 60 decides whether or not execution of processing of steps S31 through S33 has finished for all the virtual machine templates 41 stored on appropriate compute servers 2 at step S15 and step S21 of the volume creation processing (S35).

When a result of this decision is No, the middleware deployment program 60 returns to step S30 and then repeats processing of steps S30 through S35, while changing in turn the virtual machine template 41 to select at step S30 to another virtual machine template 41 for which step S31 and subsequent steps have not yet been executed.

Eventually, when middleware deployment program 60 finishes the creation of virtual machines based on all the virtual machine templates 41 for appropriate storage nodes 3 stored at step S15 and step S21 of the volume creation processing, when the step 35 returns a Yes result, it terminates this node creation processing.

(3-4) Processing Upon Fault Detection

Figure 13:
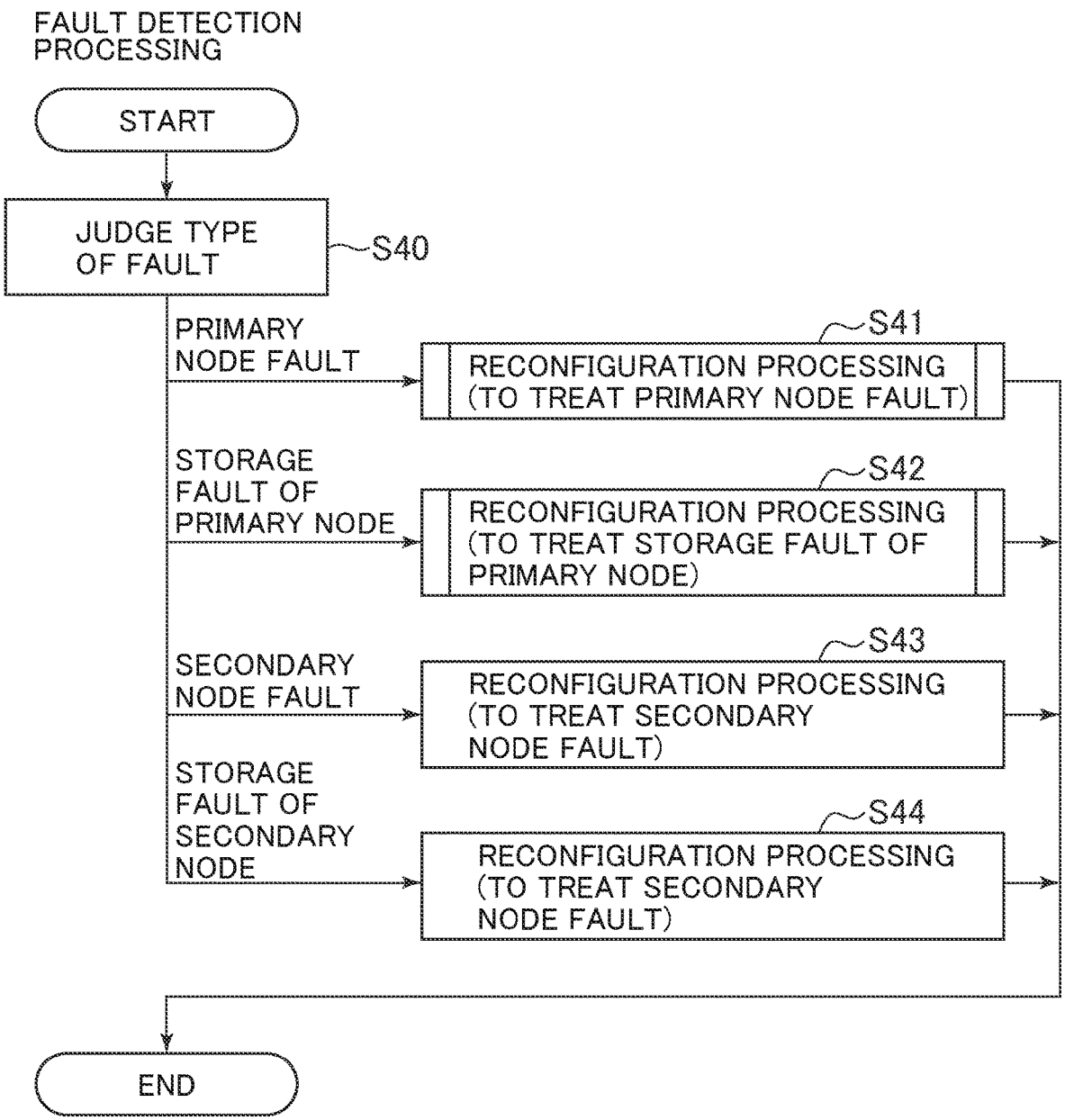
FIG. 13 is a flowchart illustrating a processing procedure of fault detection processing.

On the other hand, in relation to the above-noted reconfiguration function, FIG. 13 illustrates a processing procedure of processing on fault detection that is performed when the fault detection program 62 (FIG. 4) has detected a fault. The fault detection program 62 monitors the states of the respective compute servers 2 and the respective storage nodes 3 in the present information processing system 1 by polling and performs this processing on fault detection illustrated in FIG. 13 upon detecting a fault of any compute server 2 or storage node 3. However, it may be arranged that, triggered by a fault occurrence, a compute server 2 or a storage node 3 notifies the controller node 4 (the fault detection program 62) that a fault has occurred.

Upon detecting a fault of any compute server 2 or storage node, the fault detection program 62 starts this fault detection processing and first judges the type of the fault (S40). In particular, it judges any one of fault types of a fault that has occurred. The fault types are as follows: a first fault type in which a fault has occurred in a virtual machine which is a replication source for any replication or a compute server 2 on which the virtual machine runs; a second fault type in which a fault has occurred in a storage node 3 in which a virtual volume allocated to a virtual machine which is a replication source for any replication is placed; a third fault type in which a fault has occurred in a virtual machine which is a replication destination for any replication or a compute server 2 on which the virtual machine runs; and a fourth fault type in which a fault has occurred in a storage node 3 in which a virtual volume allocated to a virtual machine which is a replication destination for any replication is placed.

Then, the fault detection program 62 causes the reconfiguration program 63 (FIG. 4) to perform reconfiguration processing depending on the fault type detected at the current point of time (S41 through S44). In particular, if having judged that the detected fault is of the first fault type, the fault detection program 62 causes the reconfiguration program 63 to perform first reconfiguration processing which will be described later with regard to FIG. 14 (S41). If having judged that the fault is of the second fault type, the fault detection program 62 causes the reconfiguration program 63 to perform second reconfiguration processing which will be described later with regard to FIG. 15 (S42). After that, the fault detection program 62 terminates this fault detection processing.

In addition, if having judged that the detected fault is of the third fault type, the fault detection program 62 refers to the compute server management table 66 (FIG. 7) and the replication management table 67 (FIG. 8), creates, in a new compute server 2, a node to replace a replication destination node running on a compute server 2 in which the currently detected fault has occurred, allocates the virtual volume which is allocated to the old replication destination node to the newly created node, and then activates the latter node (S43). After that, the fault detection program terminates this fault detection processing.

Furthermore, if having judged that the detected fault is of the fourth fault type, the fault detection program 62 creates, in a new storage node 3, a new node to replace a node (which will be referred to as a faulty node) to which a virtual volume within a storage node 3 in which the fault has occurred, has so far been allocated, allocates a virtual volume of the same storage hierarchy as that of the virtual volume allocated to the faulty node to the above new node, and reactivates the new node (S44). After that, the fault detection program 62 terminates this fault detection processing.

(3-5) First Reconfiguration Processing

Figure 14:
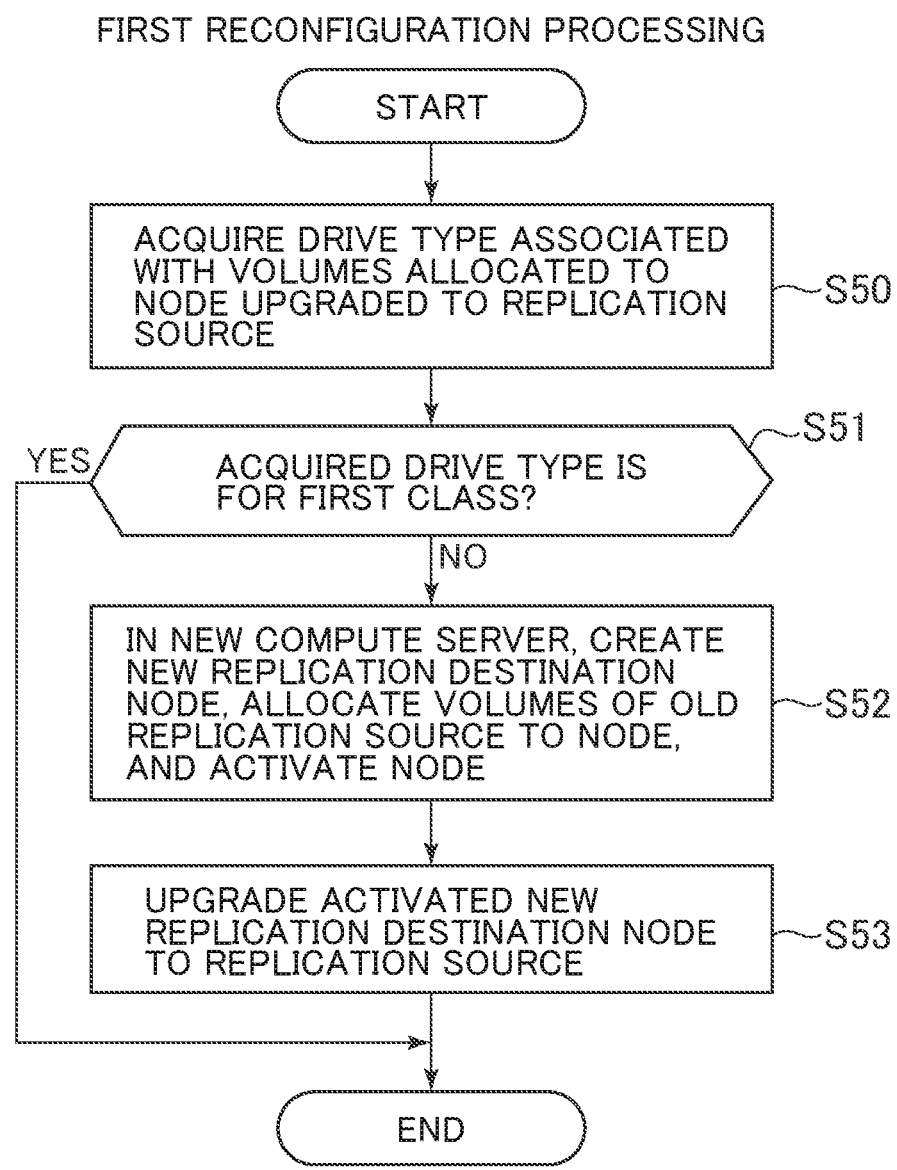
FIG. 14 is a flowchart illustrating a processing procedure of first reconfiguration processing.

FIG. 14 illustrates processing detail of first reconfiguration processing which is performed by the reconfiguration program 63 (FIG. 4) that received a command from the fault detection program 62 (FIG. 4) at step S41 of the fault detection processing described above with regard to FIG. 13.

When given such command from the fault detection program 62, the reconfiguration program 63 starts this first reconfiguration processing illustrated in FIG. 14 and, referring to the compute server management table 66 (FIG. 7), first acquires the drive type of storage devices 23 which allocate a storage area to a virtual volume allocated to a node upgraded to a replication source automatically due to the fault occurrence (the storage devices 23 constituting a pool to which the virtual volume is made to belong) (S50).

In particular, from among all records of compute server management table 66, the reconfiguration program 63 searches out a set of records in which the compute server ID of the compute server 2 in which the fault has occurred currently is stored in the compute server ID column 66A (FIG. 7). If the node upgraded to a replication source automatically due to the fault occurrence is a virtual machine, the program 63 searches out a record in which the corresponding virtual machine ID is stored in a cell of the virtual machine ID column 66B (FIG. 7) within the above set of records. If that node is a process, the program 63 searches out a record in which the process ID of the process is stored in a cell of the process ID column 66C (FIG. 7). Then, the program 63 acquires the drive type stored in a cell of the drive type column 66H (FIG. 7) in the record.

Then, the reconfiguration program 63 refers to the drive judgment table 64 (FIG. 5) and decides whether there is a match between the drive type acquired at step S50 and the drive type of storage devices 23 to be allocated to nodes of the first class (S51).

This decision is made by comparing the drive type acquired at step S50 with the drive type stored in the drive type column 64E (FIG. 5) cell in a record in which the type of middleware programs 44 that the corresponding node uses is stored in the middleware type column 64A (FIG. 5) cell and a first class is stored in the node class column 64B (FIG. 5) cell among records of the drive judgment table 64 and deciding whether or not both the drive types match. When a result of this decision is Yes, the reconfiguration program 63 terminates the first reconfiguration processing.

Otherwise, when a result of the decision at step S51 is No, the reconfiguration program 63 creates a new replication destination node within a new compute server 2, allocates a virtual volume allocated to the old replication source node to that node, and activates that node (S52).

In particular, referring to the replication management table 67 (FIG. 8), the reconfiguration program 63 acquires all compute server IDs of respective compute servers placed discretely on respective nodes that carry out the replication which is a target of current processing. Then, referring to the compute server management table 66, the reconfiguration program 63 selects a compute server 2 assigned a compute server ID other than the compute server IDs thus acquired and issues a command to create a new node in the compute server 2.

At this time, the reconfiguration program 63 may select a compute server 2 in which a new node is to be created, taking a Fault Set of compute servers 2 into account as well. Here, the "Fault Set" is a group of compute servers 2 which share a power supply line and a network switch. By selecting a destination to which a node is to be placed so that respective nodes constituting a replication group belong to different Fault Sets respectively, it is possible to make up a replication group having higher fault tolerance.

Therefore, at step S52, the reconfiguration program 63 may select a compute server 2 in which such a new node is to be created from among compute servers 2 that satisfy a condition of belonging to a Fault Set to which every one of compute servers 2 on which other nodes carrying out the replication which is a target of current processing run respectively does not belong, in addition to the above-noted condition.

Then, the reconfiguration program 63 issues a command to allocate the virtual volume allocated to the old replication source node to the new node to the compute server 2 and, after that, issues a command to activate the new node to the compute server 2.

Then, the reconfiguration program 63 changes the node type of the new node activated at step S52 as a replication destination for the replication which is a target of current processing to a replication source for the replication (S53).

In particular, to a compute server 2 on which the node upgraded to a replication source for the replication due to the fault occurrence is placed, the reconfiguration program 63 issues a command to return the node type of that node to a replication destination in the replication configuration. Then, on the compute server 2 having received this command, the middleware programs 44 that the node uses changes the node type of the node to a replication destination.

Concurrently with this, to the compute server 2 on which the new node is activated at step S52, the reconfiguration program 63 issues a command to change the node type of that node to a replication source. Thus, on the compute server 2 having received this command, the middleware programs 44 that the node uses changes the node type of the node to a replication source.

Upon completion of the above processing, in response to node type change for the new node carried out at step S53, the reconfiguration program 63 updates information in the node type column 66E for the corresponding record in the compute server management table 66 and necessary information in the class column 67B for the corresponding record in the replication management table 67 and, after that, terminates this first reconfiguration processing.

(3-6) Second Reconfiguration Processing

FIG. 15 illustrates processing detail of second reconfiguration processing which is performed by the reconfiguration program 63 (FIG. 4) that received a command from the fault detection program 62 (FIG. 4) at step S42 of the fault detection processing described previously with regard to FIG. 13.

When given such command from the fault detection program 62, the reconfiguration program 63 starts this second reconfiguration processing illustrated in FIG. 15 and first acquires the drive type of storage devices 23 which allocate a storage area to a virtual volume allocated to a node upgraded to a replication source automatically due to the fault occurrence (the storage devices 23 constituting a pool to which the virtual volume is made to belong) (S60) in the same manner as for step S50 of the first reconfiguration processing.

Then, the reconfiguration program 63 decides whether there is a match between the drive type acquired at step S60 and the drive type of storage devices 23 to be allocated to nodes of the first class in the corresponding replication configuration (S61) in the same manner as for step S51 of the first reconfiguration processing. When a result of this decision is Yes, the reconfiguration program 63 proceeds to step S63.

Otherwise, when a result of the decision at step S61 is No, the reconfiguration program 63 issues a command to relocate data stored in a virtual volume allocated to the node upgraded to a replication source to a pool comprised of storage devices 23 of the appropriate drive type to be allocated to nodes of the first class in the replication to a storage node 3 in which the virtual volume allocated to that node is set up (S62).

Then, the Tier control program 51 (FIG. 3) in the storage node 3 having received this command migrates the data stored in the virtual volume being allocated to the node upgraded to a replication source to any pool that is comprised of storage devices 23 of the appropriate drive type to be allocated to nodes of the first class in the replication on a per-page basis. Also, the Tier control program 51 changes the destination to store data written on per page in the virtual volume, which is internally managed within the storage node 3 itself, to pages of the destination to which the data is migrated in the pool to which the data is migrated. Moreover, the Tier control program 51 upgrades the volume management table 52 (FIG. 9) in response to the above data migration.

After that, the reconfiguration program 63 allocates a new virtual volume to a new node and activates the node as a new replication destination in the replication which is a target of current processing (S63).

In particular, from among compute servers 2 in the present information processing system 1, referring to the replication management table 67 (FIG. 8), the reconfiguration program 63 first selects one compute server 2 from among compute servers 2 other than compute servers 2 on which any one of nodes that carry out the replication which is a target of current processing exists. When doing so, the reconfiguration program 63 may select a compute server 2, taking a Fault Set of compute servers 2 into account as well, in addition to the above-noted condition, as described previously with regard to step S52 in FIG. 14. Then, the reconfiguration program 63 issues a command to create a node of a new replication destination instead of the node upgraded to a replication source in the replication to the selected compute server 2. In the following, the node created at this point of time will be referred to as a new node.

In addition, referring to the compute server management table 66 (FIG. 7) and the volume management table 52, the reconfiguration program 63 selects one storage node 3 from among storage nodes 3 in the present information processing system 1. More specifically, the program selects one storage node 3 that provides no virtual volumes to any one of the nodes that carry out the replication which is a target of current processing. When doing so, again, the reconfiguration program 63 may select a storage node 3, taking a Fault Set of storage nodes 3 as well. In this case, the reconfiguration program 63 may expediently select a storage node 3 from among storage nodes 3 that satisfy a condition of belonging to a Fault Set to which every one of storage nodes 3 which provide virtual volumes to any one of the nodes that carry out the replication which is a target of current processing does not belong, in addition to the above-noted condition.

Then, the reconfiguration program 63 issues a command to create a specified quantity of virtual volume to the selected storage node 3. In the following, the virtual volume created at this point of time will be referred to as a new virtual volume.

Then, the reconfiguration program 63 allocates the new virtual volume thus created to the new node thus created and, after that, issues a command to activate the new node as a replication destination in the replication which is a target of current processing to the compute server 2 selected as above.

Upon completion of the above processing, in response to the virtual volume allocation to the new replication destination node carried out at step S63, the reconfiguration program 63 updates information contained in the corresponding records in the compute server management table 66 and the replication management table 67 and, after that, terminates this second reconfiguration processing.

(4) Advantageous Effects of the Present Embodiment

As described hereinbefore, in the information processing system 1 of the present embodiment, when a compute server 2 deploys a node together with middleware, the compute server 2 allocates a virtual volume made to belong to a pool comprised of storage devices 23 of a drive type predefined to be appropriate for a combination of the type of middleware programs 44 that the node uses and the node type of the node acting in a replication group to which the node belongs.

Therefore, according to the present information processing system 1, it is possible to allocate, to a node, a virtual volume of a suitable storage hierarchy for the type of middleware programs 44 (middleware type) that the node uses and the node type of that node. Consequently, if the type of middleware programs 44 is, e.g., MongoDB, it can be prevented that virtual volumes made to belong to a pool comprised of expensive storage devices 23 such as SSD are allocated to nodes that are set as "Secondary" and, accordingly, the operation cost of the present information processing system 1 can be reduced.

In addition, in the present information processing system 1, a virtual volume to be allocated to each node is selected from virtual volumes created in a storage node 3 having the largest amount of free space of storage of a hierarchy to which the virtual volume belongs. Therefore, a significant difference in the I/O frequency occurring among respective storage nodes 3 can be obviated.

Furthermore, in the present information processing system 1, in a case where a fault has occurred in any compute server 2 or storage node 3, the controller node 4 so controls compute servers 2 and storage nodes 3 to change virtual volumes allocated to nodes to virtual volumes of a suitable storage hierarchy. Nodes that must be subjected to this change depends on what is the fault.

Therefore, according to the present information processing system 1, for instance, even in a case where a fault occurs in a compute server 2 on which a replication source node is placed or a storage node 3 in which a virtual volume allocated to the node exists and a node that is being so far a replication destination has been upgraded to a replication source, it is possible to obviate a deterioration in response performance of the present processing system 1 viewed from the client 6.

(5) Other Embodiments

While the foregoing embodiment has been described for a case where the present invention is applied to the information processing system 1 configured as in FIG. 1, the present invention is not limited to this and the present invention can be widely applied to other information processing systems having diverse configurations.

In addition, while the foregoing embodiment has been described for a case where virtual volumes are applied as volumes which are allocated to respective virtual machines and processes, the present invention is not limited to this and, for example, logical volumes (solid logical volumes, not virtual) in which storage devices 23 provide a storage area directly may be applied.

Furthermore, while the foregoing embodiment has been described for a case where a node is a virtual machine running on a compute serve 2 or one process that is executed by the virtual machine, the present invention is not limited to this and a node may be a container and, moreover, a compute server 2 itself may be a node (compute server 2 may constitute a node).

Furthermore, while the foregoing embodiment has been described for a case where one virtual volume is allocated to one node, the present invention is not limited to this and the present invention can be applied even to a configuration where multiple nodes (e.g., two volumes: a data volume and a journal volume) may be allocated to one node.

Furthermore, while the foregoing embodiment has been described for a case where volume allocation is arranged to allocate a virtual volume of a higher storage hierarchy to a node whose node type is a higher node class, the present invention is not limited to this and volume allocation may be arranged to allocate a virtual volume of a higher storage hierarchy to a node whose node type is a lower node class when, e.g., Neo4j is applied. A determination as to allocating a virtual volume of what storage hierarchy to a node of what node class as the node type may appropriately be made depending on the type of middleware that the node uses.

Furthermore, while the foregoing embodiment has been described for a case where an arrangement is made to select a destination to locate a virtual volume which is allocated respectively to each of nodes constituting a replication group from a storage node 3 having the largest amount of free space of storage of the corresponding hierarchy, as described previously with regard to the volume creation processing in FIG. 11, the present invention is not limited to this and an arrangement may be made to select a destination to locate a virtual volume which is allocated respectively to each node, taking a Fault Set of storage nodes 3 as well.

The present invention can be applied to an information processing system where plural types of virtual machines run which constitute a replication group respectively and have respectively different levels of response performance for a volume that is requested.

What is claimed is:

1. An information processing system where multiple nodes run which perform data read and/or write processing, the information processing system comprising:
    at least one compute server which configures at least one of the nodes or on which one or multiple ones of the nodes run;
    at least one storage node on which storage devices of plural types of drives having different levels of response performance are mounted respectively and at least one volume is created for which one of the storage devices of any drive type provides a storage area; and
    a controller node which controls the at least one compute server and the at least one storage node,
    wherein each of the nodes and another or other ones of the nodes constitute a replication group to carry out replication,
    wherein the at least one storage node classifies the respective storage devices mounted thereon into a plurality of storage hierarchies according to the drive type of each of the storage devices for management of the storage devices,
    wherein the controller node allocates, to each node of the nodes, a volume of the at least one volume for which one of the storage devices, of a storage hierarchy suitable for a type of middleware that the node uses and a node type of the node acting in the replication group, provides a storage area, respectively
    wherein when having detected a fault of a first compute server which configures a replication source node of the nodes, as the node type in the replication group, or when having detected a fault of the compute server on which the replication source node exists, the controller node upgrades another one of the nodes constituting the replication group to the replication source to replace the replication source node and allocates a particular volume of the replication source node affected by the fault occurrence to a particular volume of the upgraded another node and activates the upgraded another node, the particular volume of the replication source node being associated with a storage hierarchy that is higher than the storage hierarchy associated with the particular volume of the upgraded another node,
    wherein after upgrading the upgraded another node, the controller node determines if the drive type of the storage device allocated to the particular volume of the upgraded another node is the same as the drive type of the storage device allocated to the particular volume of the replication source node, and
    wherein when the drive type of the storage device allocated to the particular volume of the upgraded another node is determined to not be the same as the drive type of the storage device allocated to the particular volume of the replication source node, the controller node allocates the volume allocated to the replication source node before the fault occurrence to a new node other than the another one of the nodes constituting the replication group and activates the new node and, after that, changes the node type of the activated new node to the replication source in the replication group.

2. The information processing system according to claim 1, wherein the controller node manages amounts of free space on each of the at least one storage node with respect to each of the storage hierarchies respectively and allocates the at least one volume from one of the at least one storage node having the largest amount of free space of the corresponding storage hierarchy to a necessary number of the nodes.

3. The information processing system according to claim 1, wherein when having detected a fault of one of the at least one storage node in which the volume allocated to a replication source node of the nodes, as the node type in the replication group, exists and when another node of the nodes constituting the replication group has been upgraded to a replication source instead of the replication source node, the controller node decides whether or not the storage hierarchy of one of the storage devices providing a storage area for the volume being allocated to the another node upgraded to the replication source is the storage hierarchy that should be allocated to the replication source node in the replication group and, if a result of the decision is No, migrates data stored in the volume being allocated to the another node upgraded to the replication source to a storage area that is provided by one of the storage devices of the storage hierarchy that should be allocated to the replication source node in the replication group.

4. The information processing system according to claim 2, wherein the controller node allocates the volumes created in the storage nodes belonging to different Fault Sets respectively to the respective nodes constituting the same replication group.

5. A volume allocation method that is performed in an information processing system where multiple nodes run which perform data read and/or write processing, the information processing system including:
    at least one compute server which configures at least one of the nodes or on which one or multiple ones of the nodes run;
    at least one storage node on which storage devices of plural types of drives having different levels of response performance are mounted respectively and at least one volume is created for which one of the storage devices of any drive type provides a storage area; and
    a controller node which controls the at least one compute server and the at least one storage node,
    wherein each of the nodes and another or other ones of the nodes constitute a replication group to carry out replication, the volume allocation method comprising:

a first step in which the at least one storage node classifies the respective storage devices mounted thereon into a plurality of storage hierarchies according to the drive type of each of the storage devices for management of the storage devices;

a second step in which the controller node allocates, to each node of the nodes, a volume of the at least one volume for which one of the storage devices of a storage hierarchy suitable for a type of middleware that the node uses and a node type of the node acting in the replication group provides a storage area;

a third step in which, when having detected a fault of a first compute server which configures a replication source node of the nodes, as the node type in the replication group, or when having detected a fault of the compute server on which the replication source node exists, the controller node upgrades another one of the nodes constituting the replication group to the replication source to replace the replication source node and allocates a particular volume of the replication source node affected by the fault occurrence to a particular volume of the upgraded another node and activates the upgraded another node, the particular volume of the replication source node being associated with a storage hierarchy that is higher than the storage hierarchy associated with the particular volume of the upgraded another node;

a fourth step in which, after upgrading the upgraded another node, the controller node determines if the drive type of the storage device allocated to the particular volume of the upgraded another node is the same as the drive type of the storage device allocated to the particular volume of the replication source node; and a fifth step in which, when the drive type of the storage device allocated to the particular volume of the upgraded another node is determined to not be the same as the drive type of the storage device allocated to the particular volume of the replication source node, the controller node allocates the volume allocated to the replication source node before the fault occurrence to a new node other than the another one of the nodes constituting the replication group and activates the new node and, after that, changes the node type of the activated new node to the replication source in the replication group.

6. The volume allocation method according to claim 5 wherein, in the first step, the controller node manages amounts of free space on each of the at least one storage node with respect to each of the storage hierarchies respectively, and wherein, in the second step, the controller node allocates the at least one volume from one of the at least one storage node having the largest amount of free space of the corresponding storage hierarchy to a necessary number of the nodes.

7. The volume allocation method according to claim 5, further comprising a sixth step in which, when having detected a fault of one of the at least one storage node in which the volume allocated to a replication source node of the nodes, as the node type in the replication group, exits and when another node of the nodes constituting the replication group has been upgraded to a replication source instead of the replication source node, the controller node decides whether or not the storage hierarchy of one of the storage devices providing a storage area for the volume being allocated to the another node upgraded to the replication source is the storage hierarchy that should be allocated to the replication source node in the replication group and, if a result of the decision is No, migrates data stored in the volume being allocated to the another node upgraded to the replication source to a storage area that is provided by one of the storage devices of the storage hierarchy that should be allocated to the replication source node in the replication group.

8. The volume allocation method according to claim 6, wherein, in the second step, the controller node allocates the volumes created in the storage nodes belonging to different Fault Sets respectively to the respective nodes constituting the same replication group.

\* \* \* \* \*